C. H. MILLER.
TRANSMISSION SHIFTING DEVICE.
APPLICATION FILED MAY 20, 1919.
1,326,281.
Patented Dec. 30, 1919.
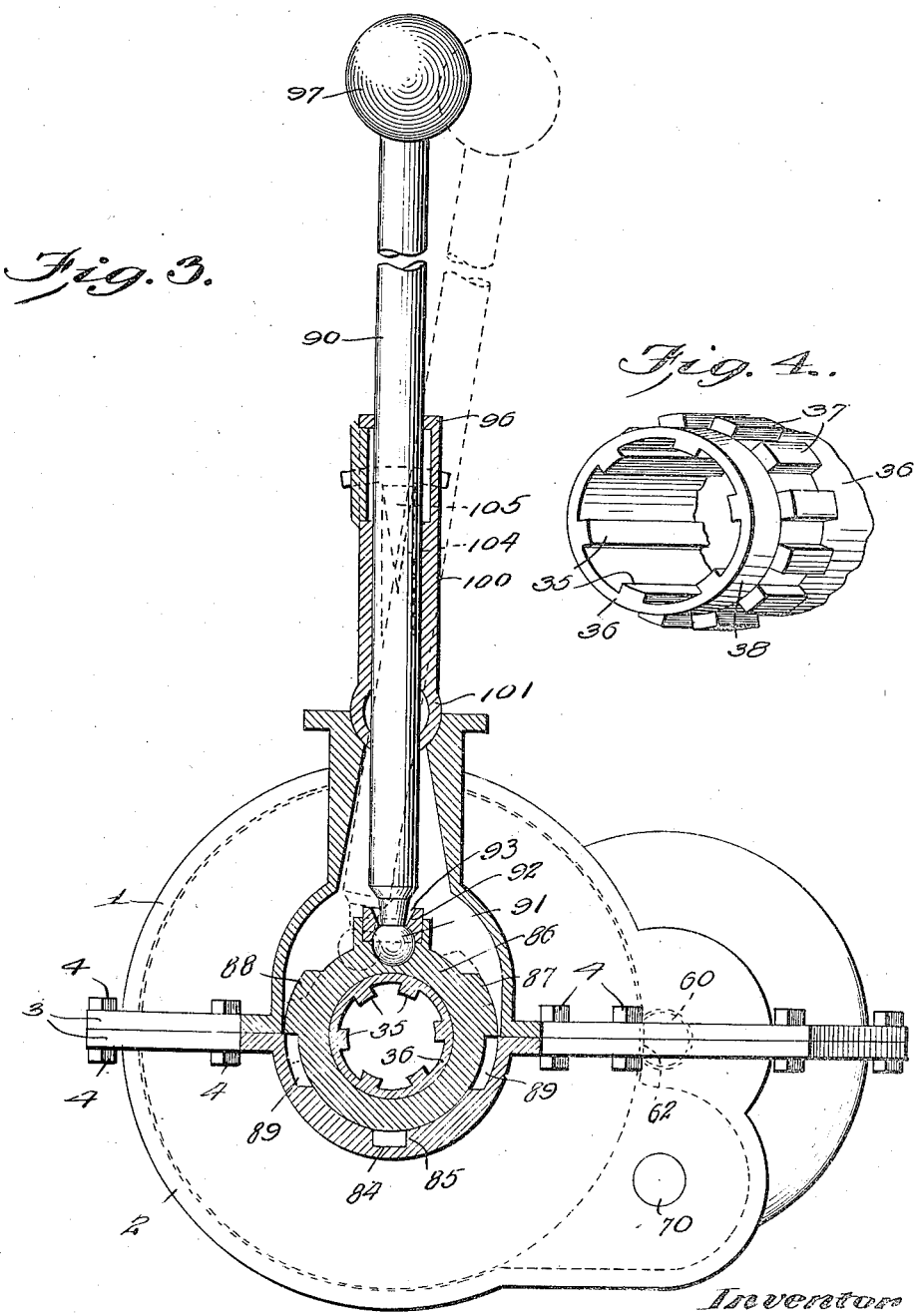

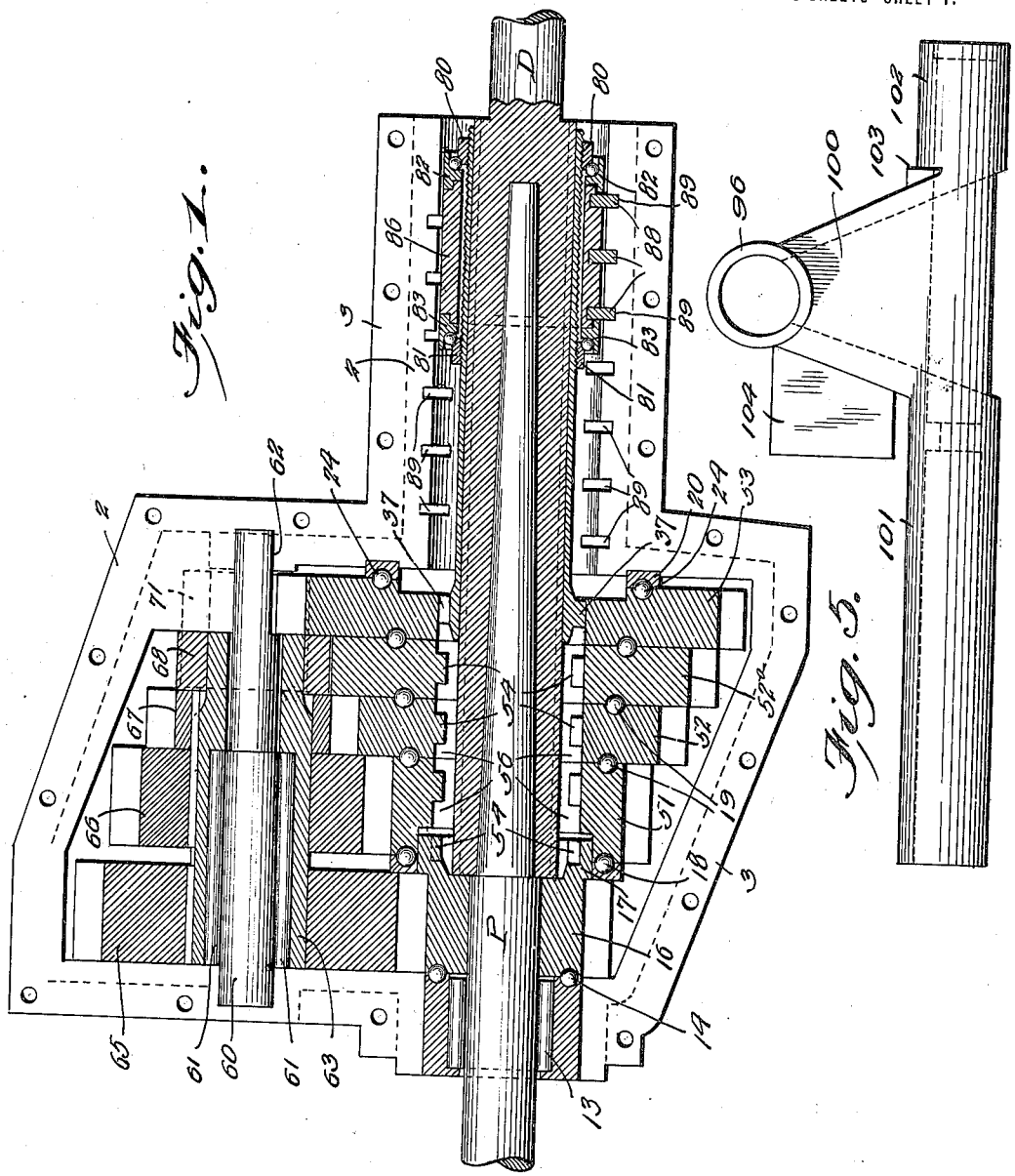

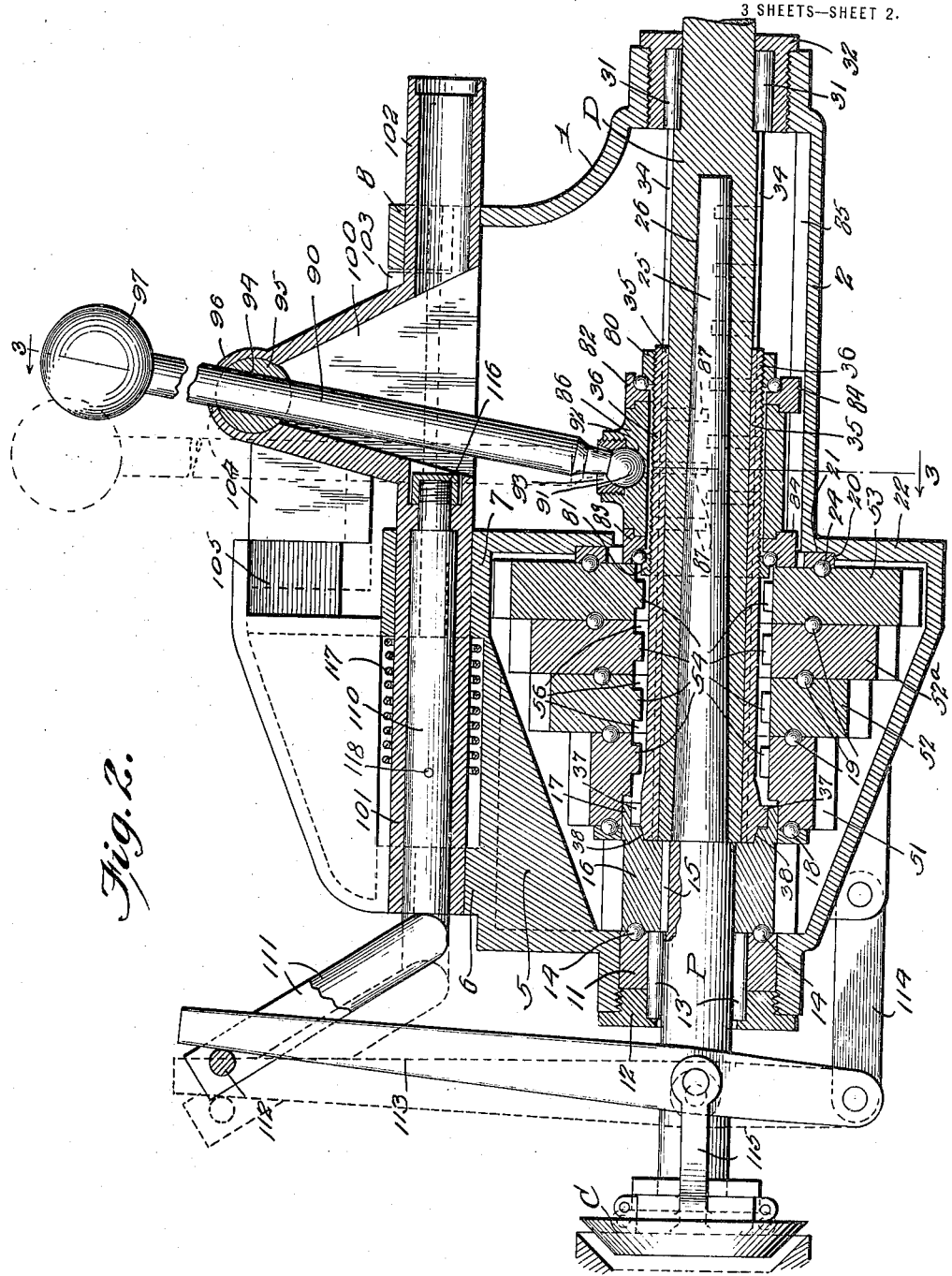

UNITED STATES PATENT OFFICE.

CHARLES H. MILLER, OF LIBERTYVILLE, IOWA.

TRANSMISSION-SHIFTING DEVICE.

1,326,281.  Specification of Letters Patent.  Patented Dec. 30, 1919.

Application filed May 20, 1919. Serial No. 298,375.

*To all whom it may concern:*

Be it known that I, CHARLES H. MILLER, citizen of the United States, residing at Libertyville, in the county of Jefferson and State of Iowa, have invented certain new and useful Improvements in Transmission-Shifting Devices, of which the following is a specification.

This invention relates to machine elements, and more especially it is a transmission mechanism such as is used on motor vehicles between the power and driven shafts; and the primary object of the invention is to produce improvements in the means for shifting such mechanism. The usual short and knobbed hand lever is employed, preferably projecting upward through the flooring within reach of the operator, and a clutch operator or "kick-out" whereby the clutch is invariably open while shifting is being accomplished. Improvements are also present in details of the construction as set forth below, wherein the invention is described in its preferred form, although I reserve the right to incorporate such changes as are possible within the spirit of the appended claims, as well as the right to omit the kick-out or to employ some other form of the transmission mechanism proper.

Referring to the accompanying drawings—

Figure 1 is a plan view with most of the upper half of the casing removed and some of the parts in section or broken away. The device is here in "reverse," with the shift sleeve rocked to the left, while the lever will stand to the right and forward and will be locked.

Fig. 2 is a vertical longitudinal section with the teeth in "direct drive," the full lines showing the clutch lever in position to hold the clutch open and the hand lever as not yet locked, and the dotted lines indicating the final lever positions and hence the locking of parts.

Fig. 3 is a cross section on the line 3—3 of Fig. 2 with the hand lever in full lines as unlocked ready to shift and in dotted lines as swung to one side.

Fig. 4 is a perspective view of the front end of the shift sleeve, and Fig. 5 is a side elevation of the fulcrum.

The casing is preferably in parts 1 and 2 having flanges 3 connected by bolts 4, and the forward portion of the top plate has a web 5 supporting bearings 6 and 7 which, with an alined cap bearing 8 at the rear, support the rocking fulcrum element described below as being part of the mechanism for shifting or manipulating the transmission. The power shaft P leads rearward from the clutch diagrammatically indicated at C, and the driven shaft D leads back and is connected with the axle which is to be rotated at various speeds by the transmission mechanism, according as the latter is set. The parts referred to will be suitably supported on the chassis, and the usual pedal may be employed, in addition to what is described below, whereby the operator may open the clutch against its closing spring.

The power shaft passes through a bearing 11 in the front of the casing which is held in place by a threaded bushing 12 and may contain balls or preferably rollers 13, and thence through a power gear 16 keyed as at 15 to the shaft and spaced from the bearing by thrust balls 14, said gear having a cupped collar 17 preferably integral with it as shown. The shaft then passes through a series of gears increasing progressively in size toward the rear and separated from each other by balls 19. The foremost of these gears (51) is cupped to inclose the collar 17 and spaced from the frame by thrust balls 18; while the rearmost and largest gear (53) is spaced by thrust balls 24 from a ring 20 resting in a pocket 21 formed in a transverse wall 22 in the casing. Thus the power gear is supported by the shaft, while the other gears are supported by the casing independently of the shaft as will be seen. The power shaft is continued rearward in a long and preferably slightly tapering tongue 25 fitting and turning within an axial socket 26 in the forward end of the driven shaft D; although of course any other suitable means might be employed to hold these shafts in strict alinement, and in fact they might abut end to end and be alined by their bearings only.

The driven shaft D passes through a ball or roller bearing 31 held in the rear end of the casing by a threaded bushing 32, forward of which bearing it is provided with a series of longitudinal grooves or keyways 34 within which slide keys or teeth 35 formed within a tube or sleeve 36. The latter extends loosely through the several gears mentioned, is headed and externally toothed near its front end as at 37, and is reduced and tapered at its extremity as at 38 to fit accurately into the collar 17.

The gears in the series mentioned are numbered 51, 52, 52ª and 53, and all of them as well as the collar 17 are internally toothed as at 54 to selectively receive the teeth on the sleeve when the latter is adjusted. But the internal teeth on these elements do not extend their full width, and there exist therefore neutral spaces 56 between the rings of teeth, through which spaces the teeth 37 on the sleeve must always pass in the event of adjustment of said sleeve. When the keys or teeth 37 are engaged with the internal teeth in the collar 17 (which might be called the smallest gear for the sake of simplicity) the mechanism is set at "high" and the drive is direct from the power shaft P to the driven shaft D; adjustment successively to the rear gives lower speeds; and finally engagement with the gear 53 gives "reverse." The number of gears may be that preferred.

The counter shaft and its gears are offset to one side of the line of the main shafts. Fixed through the casing is a rod or pin 60 reduced or cut away at its rear portion as at 62 to permit the large reverse gear to run freely past it. Mounted on a roller bearing 61 around this rod or pin is a tubular shaft or sleeve 63 to whose forward portion are keyed the gears 65, 66, and 67, and whose rear portion may carry another gear or preferably have gear teeth 68 formed upon it; and these counter gears mesh respectively with the driving gears 16, 51, 52, and 52ª as shown. The idler shaft 70 as usual underlies the counter shaft, and carries a long idler 71 in constant mesh with the smallest counter gear 68 and the reverse driver 53. I have purposely given details of the transmission mechanism which are essential only in the broadest sense, and I do not wish to be limited to such details although their use in connection with the manipulating mechanism yet to be described produces a successful device easily operated, inexpensive to make, and readily adjustable and accessible.

The shifting mechanism for this device includes a shift collar swiveled to the key sleeve and having means to lock it in adjusted positions, a lever for shifting and rocking said collar, and a peculiar fulcrum for the lever; and, as will yet be set forth, the movements of the fulcrum may be utilized to kick out the clutch in order to prevent accidents.

A ring 80 is screwed onto the rear end of the key sleeve, and another ring 81 run onto the same somewhat farther forward. These form the outer and rotating members of ball bearings whose inner rings or races 82 and 83 have lugs 84 at the bottom slidably mounted in a groove along the bottom of the casing as seen at 85 so that said races may move back and forth but may not rotate or oscillate. Between the races is swivelly mounted a shift collar 86 having one or more tongues 87 projecting from one side and one or more tongues 88 from the other side, and the casing is provided internally on opposite sides of its groove 85 with alternated upright grooves 89. The mouths or upper portions of these grooves may be flared slightly, and the lower ends of the tongues tapered slightly, or either, to permit their ready engagement. One set of grooves is disposed to agree with the spacing of the internal teeth in the driving gears, and the other set of grooves to agree with the neutral spaces between such teeth. Accordingly, if the collar be oscillated to turn it to one side, the key sleeve must be in a position where its toothed front end 37 will engage the internal teeth of some gear, whereas if the collar be turned to the other side, said toothed end absolutely cannot be engaged with any gear. In either lateral position of the collar 86 the shift sleeve may not be moved longitudinally, but such shifting thereof can occur when the collar stands between the extremes described and none of its tongues engage any groove.

A hand lever is provided for operating the collar 86. As herein shown this consists of a rod 90 having a ball 91 at its lower end engaging a socket 92 on the top of the collar, the mouth of the socket being enlarged as at 93 to permit freedom of movement of parts as indicated in Fig. 3. The rod leads upward, passes slidably through a hole 94 in a roller 95 which is rotatably mounted in a cylinder 96, and carries a ball or knob 97 at its upper extremity, standing within easy reach of the operator. In the shifting of the collar back and forth, the roller turns within the cylinder as the fulcrum of the lever; but in the swinging of the collar from side to side, the roller cannot so turn and therefore another fulcrum is necessary. In either movement of the collar, the rod 90 will slide slightly through the hole 94 in the roller as will be understood.

A dome 100 supports the cylinder 96 at its apex. This dome has a forward tubular trunnion 101 rotatably and slidably mounted in the bearings 6 and 7 on the casing, and a rearward alined trunnion 102 mounted in the cap bearing 8 in the same manner. In its rearward position, as seen in full lines in Fig. 2, a shoulder 103 on the back of the dome abuts against a suitable stop such as the bearing 8. At this time a tongue 104 at the front of the dome may pass across the rear edge of an upright wedge 105 fixedly carried at the top of the casing, but in order that the dome may be moved forward, it must be swung to one side or the other by means of the hand lever 90. The trunnions of the dome therefore constitute the pivotal point on which the lever is swung from side to side, and the roller 95 its pivot for movement forward and backward; or in other words, this structure as an entirety constitutes the fulcrum for either movement of the lever as well as the lock for holding said lever at either lateral extreme and the sleeve with its teeth fully engaged with one gear or in some neutral position and entirely disengaged from any gear.

A fork has its shank 110 mounted within the tubular trunnion 101 and its arms 111 upbent and connected by a pin 112. Between the arms behind the pin projects the upper end of a clutch lever 113, the lower end of which is herein shown as connected by a link 114 with the casing; and this lever is connected in any appropriate manner, as diagrammatically shown at 115, with the clutch C. The rear end of the shank 110 is swiveled within the trunnion 101 at 116 so that it must be shifted with the fulcrum but is not rocked thereby. A spring 117 engages the casing at one end and a pin 118 through the shank, and bears the parts normally forward (when the position of the tongue and wedge permits) so that the clutch may close; but the depth of the fork is such that the clutch lever may at any time be moved as (by a pedal) to open the clutch manually, as usual. I have indicated the clutch mechanism only diagrammatically, and any form of connection between it and the clutch lever may be employed which will answer.

The operation of devices of this general character is well understood, and I have therefore considered it necessary to show the teeth in but two positions, reverse in Fig. 1 and direct drive in Fig. 2. Starting with the parts as in full lines in the last named view where the hand lever yet stands upright as in Fig. 3, if the operator desires to lock the device in direct drive, he swings the lever 90 aside so that the tongue 104 may pass the wedge 105 (see the dotted lines in Fig. 3) and then pushes it forward to the dotted position in Fig. 2, thereby moving the clutch lever 113 and closing the clutch C. In this act the swinging of the hand lever also turned the collar 86 and engaged its tongues 88 in the proper grooves 89, and therefore forward movement of the upper end of the hand lever did not result in rearward movement of the collar and change in engagement of the teeth. In other words, the first impulse on the hand lever which sets it in position to be locked locks the collar, and the second impulse (forward) of this lever therefore moves it on a fulcrum which is now fixed.

Coming out of direct forward drive, the operator must first retract the hand lever to disengage the tongue and wedge, and, in fact, he must do this in any case because he cannot otherwise swing the lever. Shifting the lever backward to the full lined position of Fig. 2 again opens the clutch C, and swinging the lever to vertical as in full lines in Fig. 3 sets the collar 86 at neutral; now the knob 97 may be moved forward to shift the collar and sleeve rearward, and the teeth 37 pass out of engagement with the internal teeth in the collar 17, first into a neutral space 56 and then into engagement with teeth 54, and so on alternately as long as the sleeve 36 slides. This it may do as long as the lever stands upright, but when the position desired by the operator has been reached, he swings the lever to one side or the other—if to the right as dotted in Fig. 3, he engages tongues 88 with grooves 89 and locks the sleeve 36 with its teeth engaging within some gear, but if to the left he engages the other tongues 87 with grooves 89 and locks the sleeve 36 with its teeth in one of the several neutral spaces 56. As the latter exist throughout the full length of the set of gears, he may of course readily find a "neutral" position next any driving position from which his movement starts. I will say, however, that I prefer to leave the transmission of my machine in neutral between "low" and "reverse" so that on starting up again the parts are the nearest to one of the two positions I must select.

Having now shifted the sleeve 36 to set its teeth 37 where desired, lateral swing of the hand lever to either side as described as necessary to lock this sleeve will of course move the tongue 104 from behind the wedge 105; and the operator may then move the lever forward to the dotted position in Fig. 2, or he may release it and permit the spring 117 to act with the same result. The entire fulcrum element of Fig. 5 now slides forward in its bearings, and the movement of the fork 110—111 and the clutch lever 113 permits the closing of the clutch C. If the operator has set the teeth 37 engaged with one of the gears, such closing of the clutch completes the change of speed; but if he has set the teeth 37 in one of the neutral spaces 56, such closing of the clutch cannot effect drive in either direction or at any speed. Fig. 1 shows the collar 86 set so far to the rear that the teeth 37 are engaged within the reverse gear 53, and the collar turned to engage tongues 88 with grooves 89; if the hand lever should now be straightened up and released or moved forward, the transmission at "reverse" would be complete.

This transmission actuating mechanism thus possesses the valuable feature that the initial movement of the hand lever, when the operator desires to change speed or to open the transmission preparatory to changing speed, automatically "kicks out" the clutch by such initial movement and while the transmission is yet closed; or, in other words, it is impossible to move the hand lever to change speed without first having retracted and centered it, and these initial movements open the clutch. On the other hand, when the operator releases the lever and possibly leaves his car or releases the lever after having set the mechanism, he must swing it to one side or the other to engage the teeth 37 with the selected gear or to set them in neutral, and such swing of the lever clears the tongue from the wedge and permits the spring 117 to act to close the clutch, even if he should omit finally to push the knob 97 to the front. In other words, it is impossible to leave the hand lever unless the clutch is closed, but the clutch closes either with the transmission positively set at some selected speed or positively set in some neutral and at no speed. Therefore the most careless driver cannot fail to operate this device properly, and but little practice is needed to teach him how it works. The many external and internal teeth on the sleeve 36 connect it reliably with the driven shaft and with the gear selected, power is transmitted from said gear at numerous points all the way around said shaft so that stripping of teeth under strain is avoided, and the outer teeth on the gears are in constant mesh with their fellows so that chipping of their corners is not induced as in transmissions where this type of teeth are slid into and out of each other.

What is claimed as new is—

1. A transmission shifting device comprising a lever adapted to be connected at its lower end with the movable transmission element, and a fulcrum mounted to swing laterally in one plane and having in another plane a roller bearing for the lever in which the lever may swing longitudinally.

2. A transmission shifting device comprising a lever adapted to be connected with the movable transmission element, and a fulcrum mounted to swing laterally of the transmission mechanism and having an elevated bearing in which the lever is mounted to swing longitudinally of the transmission mechanism.

3. A transmission shifting device comprising a lever adapted to be connected with the movable transmission element, a fulcrum mounted to oscillate on an axis longitudinal of the transmission mechanism and having a raised dome, and a roller mounted in a bearing in the dome on an axis transverse to the transmission mechanism and through which roller said lever is slidably mounted.

4. In a transmission shifting device, the combination with a casing having alined bearings above the transmission mechanism proper and a wedge on the foremost bearing, a fulcrum having trunnions mounted in said bearings, a dome between the trunnions, and a tongue on the dome adapted to pass to either side of said wedge when the dome is swung aside and moved forward; of a lever pivoted in the apex of the dome to swing only in a plane through said trunnions and adapted to be connected with the movable transmission element, and means to free said element for shifting when the lever stands in a vertical plane and to lock it when the lever is swung to either side.

5. In a transmission shifting device, the combination with a casing having alined bearings above the transmission mechanism proper and a wedge on one bearing, a fulcrum having trunnions mounted in said bearings, a dome between the trunnions, and a tongue carried by the fulcrum and adapted to pass to either side of said wedge when the dome is swung aside and moved forward; of a transverse cylinder at the apex of said dome, a roller journaled in said cylinder and having a hole, and a lever slidably mounted through said hole and having a handle at its upper end and its lower end adapted to be connected with the movable transmission element.

6. In a transmission shifting device, the combination with a casing having alined bearings above the transmission mechanism proper and a wedge on one bearing, a fulcrum having trunnions mounted to oscillate and to slide in said bearings, a dome between the trunnions, and means on the dome to engage said wedge for preventing oscillation of the trunnions when the dome is swung aside and moved forward, and a bearing in the dome on a line at right angles to the bearings in the casing; of a lever pivoted in and sliding through the dome-bearing and adapted to be connected at its lower end with the movable transmission element, and means to free said element for shifting when the lever stands in a vertical plane and to lock it when the lever is swung to either side.

7. In a transmission shifting device, the combination with a casing having alined bearings above the transmission mechanism proper, a fulcrum having trunnions mounted in said bearings and a dome adapted to swing as the trunnions are oscillated in their bearings, and means for locking the fulcrum against oscillation when the dome is swung to either side and shifted forward; of a lever pivoted in the apex of the dome to swing in a plane through said trunnions, the lever adapted to be connected with the movable transmission element, and means to free said element for shifting when the lever stands in a vertical plane and to lock it against shifting when said fulcrum is locked.

8. In a transmission shifting device, the combination with a casing having alined bearings above the transmission mechanism proper, a fulcrum having trunnions oscillating and sliding in said bearings and a raised dome on the trunnions, means for locking the fulcrum against oscillation when the dome is swung to either side and shifted forward, and a spring connecting the casing with the fulcrum and urging it forward to normally hold it so locked; of a lever pivoted in the apex of the dome to swing in a plane through the trunnions, the lever adapted to be connected with the movable transmission element, and means to free said element for shifting when the lever stands in a vertical plane and to lock it against shifting when the fulcrum is locked, as described.

9. In a transmission shifting device, the combination with a casing having alined bearings, a fulcrum having trunnions oscillating and sliding therein, a transverse bearing on the fulcrum, means for locking the fulcrum when turned to either side and shifted forward, and an expansive spring in said casing around one trunnion urging it forward to normally hold the fulcrum so locked; of a lever pivoted in and sliding through said transverse bearing, the lever adapted to be connected with the movable transmission element, and means for locking said element against shifting when the fulcrum is locked.

10. In a transmission shifting device, the combination with a lever for actuating the movable transmission element, a fulcrum having trunnions sliding longitudinally and oscillating transversely in the casing, a bearing in the fulcrum in which the lever is mounted to swing longitudinally of the casing, and means for locking the fulcrum when swung to either side and slid to one extreme of its movement but for releasing it when retracted; of means for connecting the fulcrum and clutch to open the latter when the former is retracted.

11. In a transmission shifting device, the combination with a lever for actuating the movable transmission element, a casing having a longitudinal bearing, a fulcrum having a tubular trunnion sliding and oscillating in said bearing and a transverse bearing for the lever, and means for locking the fulcrum when swung to either side and slid forward or releasing it when retracted; of a fork whose shank is swiveled in said tubular trunnion and whose arms are connected by a pin, and a lever connected with the clutch and having one end extending between said fork-arms behind the pin whereby the clutch is opened when the fulcrum is retracted.

12. In a transmission shifting device, the combination with a lever for actuating the movable transmission element, a casing, a fulcrum sliding and oscillating therein, a pivot in the fulcrum for the lever, means for locking the fulcrum when swung to either side and slid forward, and a spring urging the fulcrum forward; of a fork whose shank is swiveled in the fulcrum and borne forward with it under the influence of said spring, and connections between the fork-arms and the clutch for opening the latter when the fulcrum is retracted.

13. In a transmission shifting device, the combination with a casing overlying the transmission mechanism proper and including alined spaced bearings and a wedge above one of them, a fulcrum having a tubular trunnion sliding and oscillating in said bearings and an upright member carrying a tongue adapted to engage the wedge when the fulcrum is swung to either side and slid forward, and a fork whose shank is swiveled within said tubular bearing and whose arms are upbent at the front end of its shank; of a lever pivoted in said upright member to swing longitudinally of the casing but adapted to be swung transversely thereof and slid therein with said fulcrum, means for connecting the lower end of the lever with the movable transmission element, and means for connecting said fork with the clutch whereby the latter is opened when the fulcrum is retracted, the fulcrum must be retracted to unlock it from the casing, and said member must be disposed vertically to permit the lever to swing longitudinally and shift the said movable element.

In testimony whereof I affix my signature.

CHARLES H. MILLER.